United States Patent [19]

Van Heel et al.

[11] 4,193,696
[45] Mar. 18, 1980

[54] MIXING APPARATUS

[75] Inventors: Theodore Van Heel; Henry Van Heel, both of Narre Warren, Australia

[73] Assignee: Burgos Pty. Limited, Melbourne, Australia

[21] Appl. No.: 909,690

[22] Filed: May 25, 1978

[30] Foreign Application Priority Data

May 26, 1977 [AU] Australia ............................ PD0245

[51] Int. Cl.² .............................................. B28C 5/14
[52] U.S. Cl. ...................................... 366/66; 366/322; 366/290
[58] Field of Search .................. 366/64, 66, 79, 83, 366/84, 88, 90, 91, 262, 266, 318, 322, 323, 324, 292, 290

[56] References Cited

U.S. PATENT DOCUMENTS

| | | | |
|---|---|---|---|
| 2,576,995 | 12/1951 | Carvel | 366/322 |
| 2,633,073 | 3/1953 | Allan | 366/322 |
| 3,221,369 | 12/1965 | Vesilind | 366/88 |
| 3,884,451 | 5/1975 | Stenmark | 366/90 |
| 3,913,897 | 10/1975 | Hanslik | 366/90 |
| 4,039,169 | 8/1977 | Bartholomew | 366/262 |

*Primary Examiner*—Robert W. Jenkins
*Attorney, Agent, or Firm*—Fleit & Jacobson

[57] ABSTRACT

A novel mixing apparatus for pulverent material, slurries and paste like material is disclosed. The apparatus is especially suitable for mixing cement and sand into mortar. The mixing apparatus comprises a casing having a cylindrical inner surface and a screw member mounted within the casing for rotation relative thereto about an axis which is coaxial with the axis of the inner surface, characterized in that the screw member includes a plurality of flights which at least approximate portions of a helical screw but which are arranged such that the tailing portion of one flight overlaps, as viewed axially, the leading portion of the next succeeding downstream flight. The overlapping flights promote turbulence in the flow which ensures good mixing.

4 Claims, 6 Drawing Figures

MIXING APPARATUS

This invention relates to mixing apparatus which is especially useful for continuous mixing of pulverent material, such as cement mortar and can be used to mix together the dry components and to mix them into a paste after water has been added.

In known mixers of this type, it is customary to employ a tubular housing within which is located a rotatable screw the flights of which are periodically interrupted so as to define axial gaps into which project pins or other obstructions about which the material to be mixed must deviate and thus increase the mixing action of the screw. Examples of this type of mixing apparatus are disclosed in U.S. Pat. No. 3,253,818 and Australian Pat. No. 411,192. The provision of the pins or other obstructions increases the cost of fabrication of the mixers and further there is some tendency for the material to clog in the region of the pins or obstructions. Accordingly, the object of the present invention is to provide a mixing apparatus which avoids the use of pins or other obstructions extending between the flights of the rotatable screw.

According to the present invention there is provided a mixing apparatus comprising a casing having a cylindrical inner surface and a screw member mounted within the casing for rotation relative thereto about an axis which is coaxial with the axis of said inner surface, said screw member including a plurality of flights which at least approximate portions of a helical screw but which are arranged such that the tailing portion of one flight overlaps, as viewed axially, the leading portion of the next succeeding downstream flight.

Each flight may comprise from 150° to 210° of a full turn of the helical screw but it is preferred that each flight comprises half a turn of the helical screw, i.e. each flight extends through 180°, as viewed axially.

Preferably further, the overlap of flights is such that the leading edge of one flight leads the leading edge of the next succeeding downstream flight by 60° to 120° but most preferably by 90°.

It is preferred that there are no axial gaps in the flights of the screw member.

In the preferred construction of the invention, the screw member comprises a number of segments mounted on a common shaft which extends coaxially through the casing, each segment being formed integrally with one of said flights.

The invention will now be further described with reference to the accompanying drawings, in which.

Figure 1:
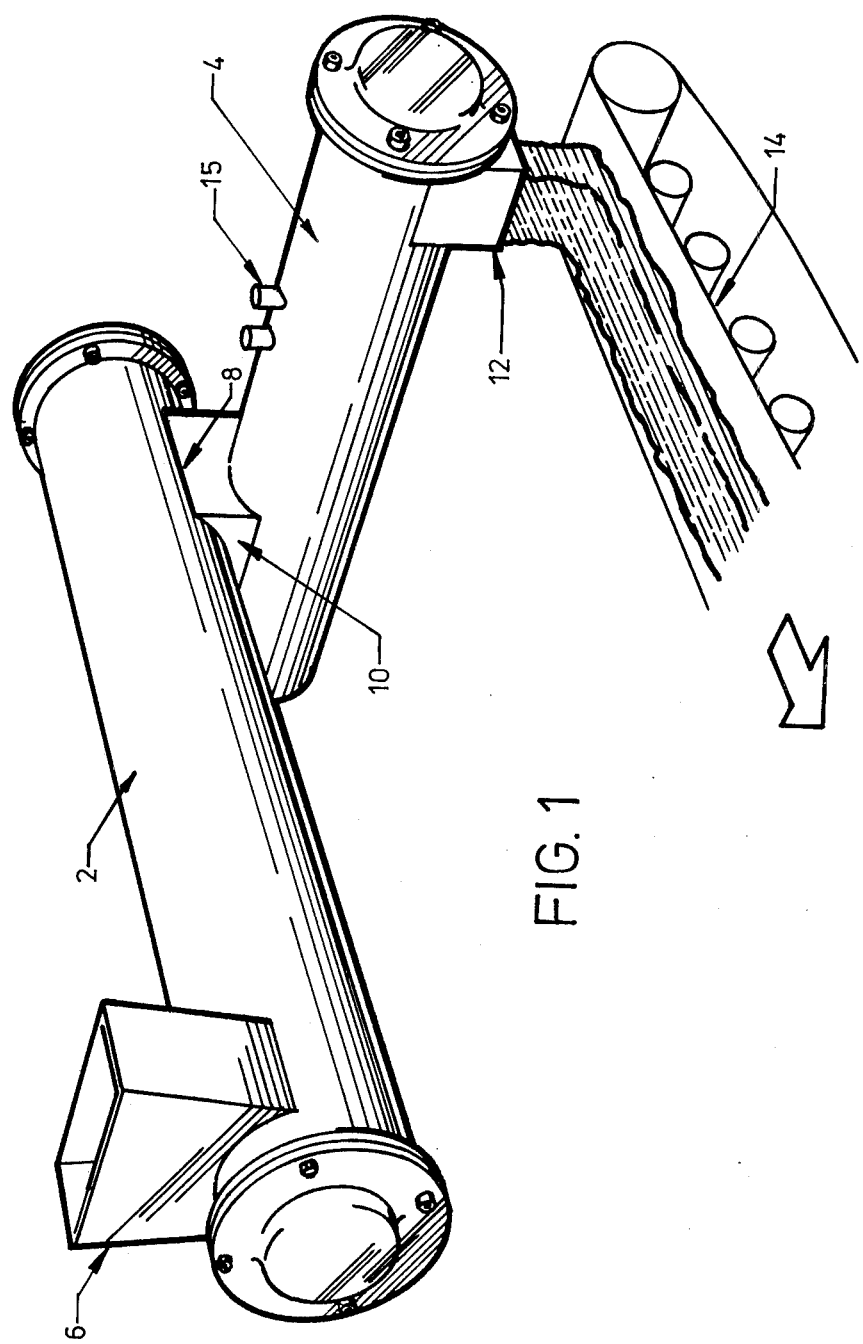
FIG. 1 is a perspective view of a mixing apparatus suitable for continuously supplying cement mortar to moulds on a conveying apparatus.

The mixing apparatus illustrated in FIG. 1 comprises a first tubular mixing portion 2 and a second mixing portion 4 extending transversely to the first portion. An inlet chute 6 is located at the upstream end of the first portion 2 for receipt of dry materias to be mixed, i.e. cement and sand. A rotatable screw extends through each of the portions 2 and 4 for conveying materials therethrough as well as mixing the materials together. The portion 2 has an outlet 8 located on its underside at the opposite end to the chute 6, the outlet 8 being in communication with the inlet of the second portion 4 by means of a connecting portion 10. Once in the second portion 4, the materials are conveyed along the portion to the other end and are discharged from an outlet 12 onto a conveyer 14 or the like. In the illustrated arrangement, dry materials are supplied to the chute 6 and are mixed together in a dry state in the upper portion 2 and fall under gravity to the second portion 4. Once in the second portion, water is supplied through nozzles 15 so as to form cement mortar of the correct consistency.

The rotatable screw for both the upper and lower portions 2 and 4 of the mixing apparatus can be identical and preferably comprise a first portion located adjacent to the inlet, the first portion being a continuous helical screw but increasing in pitch in the downstream direction. An increasing pitch in the downstream direction is known in the art and facilitates in mixing of the components. The major part of each rotating screw is, in accordance with the invention, arranged so that the flights are at least partially overlapping, as viewed axially.

Figure 2:
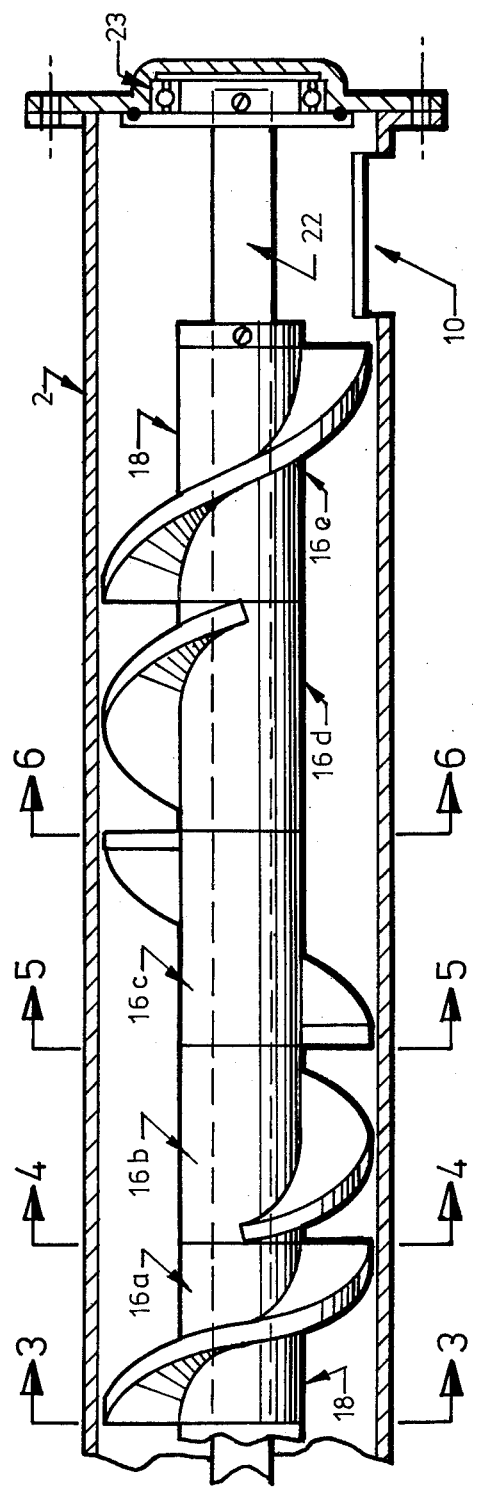
FIG. 2 is a longitudinal cross-sectional view through part of the apparatus shown in FIG. 1.
Figure 3:
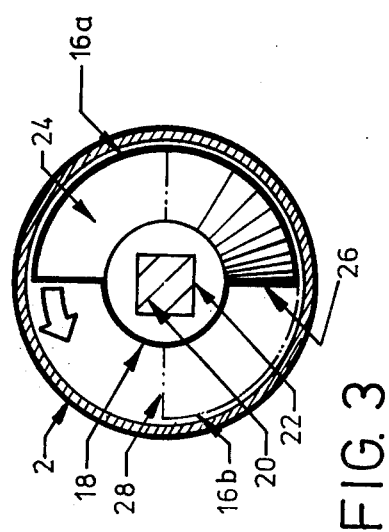
Figure 5:
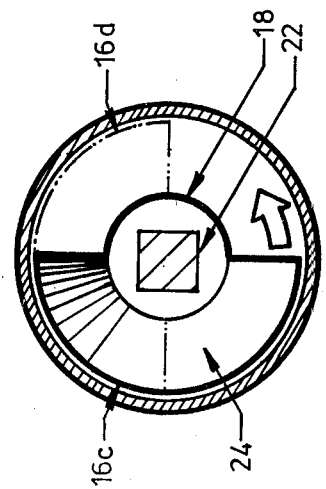

Referring now to FIG. 2, there is shown a longitudinal view of the downstream end of the upper mixing portion 2 (which is the same as downstream end of the lower mixing portion 4). The arrangement includes a plurality of flight segments 16 each of which is identical and comprises a central cylindrical portion 18 having a square recess 20 through which a driving shaft 22 extends, the end of which is supported by bearing 23. Projecting outwardly from each cylindrical portion is a screw flight 24 which, as viewed axially as in FIG. 3, is helical and extends through 180°, the pitch of the helix being equal to twice the length of the cylindrical segments 18.

Figure 4:
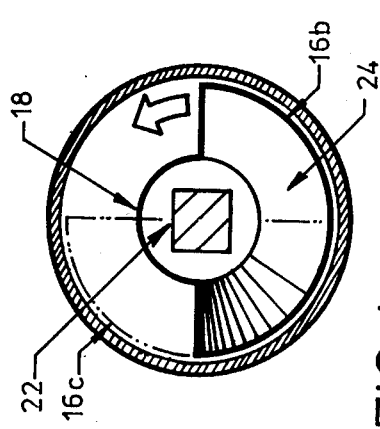
FIGS. 3 to 6 are cross-sectional views taken on the lines 3—3, 4—4, 5—5 and 6—6, marked on FIG. 2.
Figure 6:
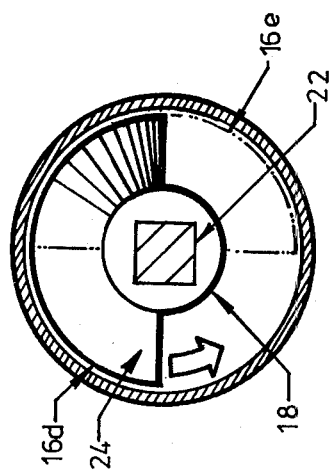

The segments 16 could be arranged on the shaft 22 such that their flights 24 define a continuous helical screw; however, in accordance with the invention, each downstream segment is advanced through 90° (relative to the leading edge of the preceding flight) so as to create discontinuities in the flight arrangement which enhances the mixing action. In FIG. 2, the successive segments are labelled 16a to 16e in the downstream direction. As can be seen best from FIG. 3, the trailing edge 26 of the flight of the segment 16a lags the leading edge 28 of the next downstream segment 16b shown in broken lines in FIG. 3 by 90°. Similarly, the trailing edge of the flight of the segment 16b trails the leading edge of the flight by 90° of the leading edge of the flight of the segment 16c, as seen in FIG. 4 and so on along the length of the shaft 22.

It has been found that the configuration and arrangement of the segments 16 produces a most satisfactory mixing performance with a minimum of clogging of the tubular housing 2. Of course, it is possible to vary the configuration of the flight segment 16 and also their relative phase to one another. In this respect, the flights 24 may extend from 150° to 210° and the successive segments can be from 60° to 120° out of phase.

Many modifications will be apparent to those skilled in the art without departing from the spirit and scope of the invention.

We claim:

1. Mixing apparatus for mixing pulverent material with a liquid to make concrete, the apparatus comprising a first and a second casing; first mixing means mounted in said first casing for mixing pulverent material; means for interconnecting an outlet of said first casing with an inlet of said second casing so that mixed material can pass from said first casing into said second casing; means for connecting said second casing to a source of liquid; second mixing means mounted in said second casing for mixing a liquid with material passing into said second casing from said first casing thereby making concrete; one of said first and second casings having a cylindrical inner surface and one of said first and said second mixing means comprising a screw member mounted within its respective casing for rotation relative thereto about an axis which is coaxial with the axis of its inner surface, said screw member including a plurality of intercoupled segments, each of said segments having a single axially extending portion defining a flight formed in the shape of 150° to 210° of a full turn of a helical screw having a leading and a tailing portion, the flights being arranged such that the tailing portion of one flight overlaps, as viewed axially, the leading portion of the next succeeding downstream flight by 60° to 120°, so that mixing occurs upon rotation of said screw member.

2. Apparatus as claimed in claim 1, wherein said first and said second casings are positioned with the axes of their inner surfaces perpendicular to each other.

3. Apparatus as claimed in claim 1, wherein the material mixed in said first casing is dry material.

4. Apparatus as claimed in claim 1, wherein both said first and second casings have cylindrical inner surfaces, and wherein said first and said second mixing means both comprise screw members, said screw members having substantially similar configurations.

* * * * *